(12) United States Patent
Whear et al.

(10) Patent No.: US 11,152,647 B2
(45) Date of Patent: Oct. 19, 2021

(54) LEAD-ACID BATTERY SEPARATORS, ELECTRODES, BATTERIES, AND METHODS OF MANUFACTURE AND USE THEREOF

(71) Applicant: Daramic, LLC, Charlotte, NC (US)

(72) Inventors: J. Kevin Whear, Utica, KY (US); James P. Perry, Utica, KY (US); Jeffrey K. Chambers, Piney Flats, TN (US); Larry A. Spickard, Waxhaw, NC (US); John R. Timmons, Owensboro, KY (US)

(73) Assignee: Daramic, LLC, Charlotte, NC (US)

( * ) Notice: Subject to any disclaimer, the term of this patent is extended or adjusted under 35 U.S.C. 154(b) by 29 days.

(21) Appl. No.: 16/161,496

(22) Filed: Oct. 16, 2018

(65) Prior Publication Data

US 2019/0051946 A1   Feb. 14, 2019

Related U.S. Application Data

(62) Division of application No. 14/704,244, filed on May 5, 2015, now Pat. No. 10,116,007.

(60) Provisional application No. 61/988,386, filed on May 5, 2014.

(51) Int. Cl.
| | |
|---|---|
| *H01M 10/12* | (2006.01) |
| *H01M 4/02* | (2006.01) |
| *H01M 2/16* | (2006.01) |
| *H01M 2/14* | (2006.01) |
| *H01M 50/403* | (2021.01) |
| *H01M 50/411* | (2021.01) |
| *H01M 50/431* | (2021.01) |
| *H01M 50/449* | (2021.01) |

(52) U.S. Cl.
CPC ......... *H01M 10/12* (2013.01); *H01M 50/403* (2021.01); *H01M 50/411* (2021.01); *H01M 50/431* (2021.01); *H01M 50/449* (2021.01); *H01M 2004/027* (2013.01); *Y02T 10/70* (2013.01)

(58) Field of Classification Search
CPC .... H01M 10/12; H01M 2/145; H01M 2/1646; H01M 2/1653; H01M 2/1686; H01M 2004/027; Y02T 10/7016
See application file for complete search history.

(56) References Cited

U.S. PATENT DOCUMENTS

| | | | |
|---|---|---|---|
| 8,277,974 B2 | 10/2012 | Kumar et al. | |
| 9,564,623 B2 * | 2/2017 | Miller | ................... H01M 2/145 |
| 2004/0081894 A1 | 4/2004 | Kimon et al. | |
| 2004/0191632 A1 | 9/2004 | Kelley et al. | |
| 2008/0076028 A1 | 3/2008 | Miller et al. | |
| 2008/0277284 A1 | 11/2008 | Nesbitt et al. | |
| 2010/0306979 A1 | 12/2010 | Bourcier et al. | |
| 2012/0070713 A1* | 3/2012 | Whear | ..................... C08L 89/00 429/143 |
| 2012/0070729 A1* | 3/2012 | Wertz | ..................... C03C 3/091 429/188 |
| 2012/0070747 A1* | 3/2012 | Whear | .................. H01M 10/06 429/247 |
| 2012/0171564 A1* | 7/2012 | Jagannathan | ....... H01M 2/1613 429/205 |
| 2013/0273409 A1 | 10/2013 | Nandi et al. | |
| 2014/0079995 A1* | 3/2014 | Wakada | ................ H01M 4/366 429/211 |
| 2014/0120422 A1 | 5/2014 | Dyke et al. | |
| 2014/0175869 A1* | 6/2014 | Phillips | ............... F02N 11/0866 307/10.1 |
| 2014/0227585 A1* | 8/2014 | Wertz | .................. H01M 2/1653 429/163 |
| 2015/0318532 A1* | 11/2015 | Manthiram | ........... H01M 2/166 429/105 |
| 2016/0126521 A1* | 5/2016 | Suonsivu | ............ H01M 2/1686 429/7 |

FOREIGN PATENT DOCUMENTS

| | | |
|---|---|---|
| GB | 2054251 A | 2/1981 |
| JP | S581966 A | 7/1983 |
| JP | H03-022350 A | 1/1991 |
| JP | 03-203158 | 4/1991 |
| JP | H07-130348 A | 5/1995 |
| JP | 2002-134086 A | 5/2002 |

(Continued)

OTHER PUBLICATIONS

Ferreira, A.L., "Battery additives: any influence on separator behavior?", Journal of Power SOU, Elsevier SA, CH, vol. 95, No. 1-2, Mar. 15, 2001 (Mar. 15, 2001), pp. 255-263.

*Primary Examiner* — Muhammad S Siddiquee

(74) *Attorney, Agent, or Firm* — Hammer & Associates, P.C.

(57) ABSTRACT

New or improved battery separators for lead-acid batteries that include a carbon or mineral additive applied to the separator. In possibly preferred embodiments, the battery separator may include engineered carbon materials applied to the battery separator to modify sulfate crystal formation while decreasing the detrimental consequences of excessive gas evolution into the negative electrode itself. In one embodiment, a method of enhancing the lead-acid energy storage performance of a lead-acid battery may include delivering carbon to the negative active material surface of the battery separator where the carbon may effectively enhance charge acceptance and improve life cycle performance of a lead-acid battery.

12 Claims, 8 Drawing Sheets

(56) References Cited

FOREIGN PATENT DOCUMENTS

| JP | 2013073737 A | 4/2013 |
| JP | 2013-168373 A | 8/2013 |
| JP | 2013-542558 A | 11/2013 |
| JP | 2013-71442 A | 10/2014 |

\* cited by examiner

LEAD-ACID BATTERY SEPARATORS, ELECTRODES, BATTERIES, AND METHODS OF MANUFACTURE AND USE THEREOF

CROSS-REFERENCE TO RELATED APPLICATIONS

This application is a divisional application of co-pending U.S. patent application Ser. No. 14/704,244 filed May 5, 2015, now U.S. Pat. No. 10,116,007, which claimed the benefit of and priority to U.S. Provisional Patent Application Ser. No. 61/988,386 filed May 5, 2014, both hereby incorporated by reference herein.

FIELD OF INVENTION

In accordance with at least selected embodiments, the instant disclosure or invention is directed to new or improved battery separators, components, batteries, systems, electrodes, and/or related methods of production and/or use, to a battery separator with carbon or mineral additives for use in a lead-acid battery, to carbon and mineral additives, and to batteries including such separators or carbon and/or mineral additives. In at least certain embodiments, the instant disclosure relates to new or improved lead-acid battery separators and/or methods of manufacture and/or use thereof. In at least select certain embodiments, the instant disclosure is directed toward a new or improved lead-acid battery separator with carbon or mineral additives and/or methods for constructing lead-acid battery separators and batteries with such carbon and/or mineral additives for enhancing the lead-acid energy storage performance, reducing lead content, and/or improving charge rate, reserve capacity, charge acceptance, cycle life, and/or the like.

BACKGROUND OF THE INVENTION

Lead-acid batteries have evolved, over time, as the demands for a source of mobile electric power have grown. In certain service applications, the flooded lead-acid battery may be operated in a partial state of charge (PSoC), for example, an approximately 50 to 80% state of charge, which is unlike the typical SLI (starting, lighting, and ignition) battery which is usually operated at 100% state of charge. For example, the hybrid electric vehicle's (HEV's) battery may operate in a PSoC, for example, at approximately 50 to 80% charge. As such, the battery may undergo shallow charge/recharge cycles, and may not undergo overcharge where dissociation of water evolves hydrogen and oxygen that mixes stratified acid within the cell.

The lead-acid battery is an excellent storage medium for energy, but one of the limitations may be the ability of the battery or battery chemistry to accept charge rapidly, particularly when the battery is at a high state of charge. In PSoC applications, this rapid charge may come from the use of regenerative braking, which may recover much of the energy used in slowing the vehicle. For this reason, the battery may typically be operated at a lower state of charge. In other applications, the battery may operate under highly demanding service conditions; in these instances incomplete charging is routine and may be difficult to avoid. For example, in developing regions of the world, the use of power inverter battery systems is common due to power grid instability. In these instances, battery charging from a discharged state may be solely dependent on unpredictable power grid availability.

Unlike many energy storage chemistries, in lead-acid batteries, the electrolyte, as well as the active materials within the electrode plates (for example, PbO, et al.), take part in the electrochemical reaction. During the electrochemical process lead sulfate is attracted to the negative electrode and is precipitated in the form of seed-crystals. Under typical fully charged operation the crystals remain small and well dispersed on the plate surface. Porosity of the electrode is marginally changed. In PSoC operation, however, the formation of the sulfate crystal is significantly less controlled. The result may be extensive sulfate crystal growth to the extent that electrode porosity is compromised. At this stage, the plate is termed "sulfated" as the crystal formation is irreversible. The ability of the negative electrode to accept charge may be dramatically reduced and eventually end of life of the battery may be reached.

The battery separator is a component that divides, or "separates", the positive electrode from the negative electrode within a lead-acid battery cell. A battery separator may have two primary functions. First, a battery separator should keep the positive electrode physically apart from the negative electrode in order to prevent any electronic current passing between the two electrodes. Second, a battery separator should permit an ionic current between the positive and negative electrodes with the least possible resistance. A battery separator can be made out of many different materials, but these two opposing functions have been met well by a battery separator being made of a porous nonconductor.

Accordingly, there is a need for new battery separator and/or battery technology to meet and overcome the new challenges arising from current lead-acid battery needs.

SUMMARY OF THE INVENTION

In accordance with at least selected embodiments, the instant invention addresses the above mentioned needs, issues or problems and provides new or improved battery separators for lead-acid batteries. In accordance with at least selected embodiments, the instant disclosure or invention is directed to new or improved battery separators, components, batteries, systems, electrodes, and/or related methods of production and/or use, to a battery separator with carbon or mineral additives for use in a lead-acid battery, to carbon and mineral additives, and to batteries including such separators or carbon and/or mineral additives. In at least certain embodiments, the instant disclosure relates to new or improved lead-acid battery separators and/or methods of manufacture and/or use thereof. In at least select certain embodiments, the instant disclosure is directed toward a new or improved lead-acid battery separator with carbon or mineral additives and/or methods for constructing lead-acid battery separators and batteries with such carbon and/or mineral additives for enhancing the lead-acid energy storage performance, reducing lead content, and/or improving charge rate, reserve capacity, charge acceptance, cycle life, and/or the like.

In at least select embodiments, the battery separator may include a carbon or mineral additive applied to the separator and/or added to the battery. In possibly preferred embodiments, the battery separator may include engineered carbon materials applied to the battery separator to modify sulfate crystal formation while addressing the detrimental consequences of excessive gas evolution into the negative electrode itself. In one embodiment, a method of enhancing the energy storage performance of a lead-acid battery may include delivering carbon to the negative active material surface of the battery separator where the carbon may enhance charge acceptance and may improve life cycle performance of a lead-acid battery.

In at least other selected embodiments, an improved battery separator and/or battery reduces required lead content, reduces separator electrical resistance (ER), increases cycle life, adds conductive material, increases cold cranking amperage (CCA) efficiency, increases open circuit voltage (OCV), minimizes entrapped gas, increases reserve capacity, improves capacitance properties, improves utilization of active material, reduces energy consumption, reduces negative plate diffusion, and/or the like.

Additionally, retention of active material is also an issue that may be addressed. In a PSoC scenario specific obstacles may exist which reduce the charge/discharge cycling efficiency of the battery. As the capability of the battery to accept charge is compromised, the cycle life of the battery may be prematurely shortened. The instant disclosure may be an innovative approach to counteract undesirable changes to charge acceptance properties of a lead-acid battery.

In lead-acid battery systems, the negative electrode may be critical to charge acceptance phenomena. The negative electrode may be considered the limiting component within an SLI battery in terms of Cold Cranking Amperage (CCA). During discharge the negative electrode may produce sulfuric acid electrolyte as the positive electrode consumes acid electrolyte. During the charging cycle these roles may be reversed. Therefore the negative electrode should constitute a porous structure allowing free adsorption of electrolyte during charge cycles. Conversely, the negative electrode should not become porosity-hindered in such a manner as to restrict the release of electrolyte during the discharge cycle. As mentioned above, during the electrochemical process lead sulfate is attracted to the negative electrode and is precipitated in the form of seed-crystals. Under typical fully charged operation the crystals remain small and well dispersed on the plate surface. Porosity of the electrode is marginally changed. In PSoC operation, however, the formation of the sulfate crystal is significantly less controlled. The result may be extensive sulfate crystal growth to the extent that electrode porosity is compromised. At this stage, the plate is termed "sulfated" as the crystal formation is irreversible. The ability of the negative electrode to accept charge may be dramatically reduced and eventually end of life of the battery may be reached. This is because to accept charge the electrode should allow for uptake of electrolyte into the porous structure. As such, an improved battery separator according to the disclosure herein may play a fundamental role in improving the performance of lead-acid batteries and may improve the operation, for example, of flooded and VRLA (valve-regulated lead-acid) energy storage devices.

DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 1 includes two photographic images.

DETAILED DESCRIPTION OF THE INVENTION

Figure 1B:
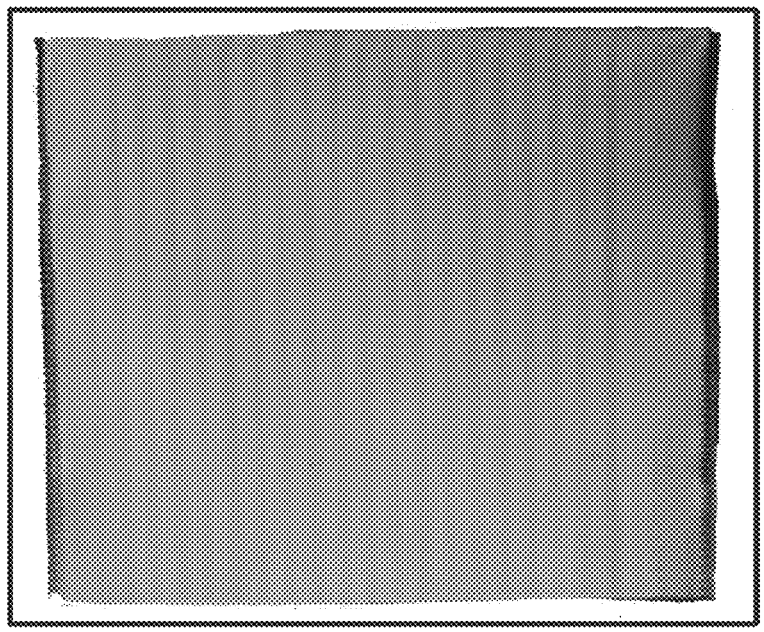
FIG. 1(b) depicts a separator without such coating.

In accordance with at least selected embodiments, the present invention may utilize engineered carbon materials (by way of example, carbon black, graphite, activated carbon, and so forth) applied to the battery separator (such as a coating, surface treatment or layer, and/or provided in the separator material adjacent the negative plate) to modify sulfate crystal formation while addressing the detrimental consequences of excessive gas evolution into the negative electrode itself.

Engineered carbons such as carbon black, graphite and activated carbon have, in the past, found some commercial use as a component of the negative active material (NAM) of a negative electrode (or anode) itself used in a lead-acid battery. In such applications, the engineered carbon materials are added to the paste or material used to form the negative electrode or anode. It has been found that these carbon additives may slow the sulfation effect (the sulfate crystal growth on the anode) under PSoC conditions. For example, it has been found that sulfate crystal growth on the anode may be directly influenced by available surface area (nucleation sites) within the plate. Increased surface area (which is provided by the engineered carbon materials applied to the anode) may provide a driving force for the establishment of smaller, less stable sulfate crystals that ultimately have less impact on the porous nature of the negative electrode. In other words, in prior art scenarios, battery manufacturers have tried adding high surface area engineered carbon materials to a negative electrode in order to create less occlusion of the pores of the negative electrode or anode and a resulting improvement in the porosity, and therefore the efficiency, of the negative electrode or anode.

Problems exist with the addition of carbon materials into a negative electrode, though. For example, adding carbon materials to a negative electrode may be expensive, since these materials are often costly. Additionally, a battery manufacturer may find that a particular lead-acid battery has a shorter life because of an overall decrease in the amount of active material in the negative electrode (since the carbon materials, designed to prevent sulfate crystal growth, would constitute "inactive material" and therefore take away from the amount of "active" material making up the entire negative electrode).

Furthermore, under typical conditions and/or reduced or partial state of charge (PSoC) conditions, the negative electrode may produce gas as the over-potential of hydrogen is reached; the evolution of gas may be well understood as evidenced by numerous commercial battery designs to control gas. However, as high surface area carbons are introduced directly into the NAM of the negative electrode or anode, acceleration of gas evolution may occur. Without wishing to be bound by theory, it is presumed that the presence of the high surface area engineered carbon materials in the negative electrode creates additional places for gas to nucleate during charging of the lead-acid battery. In this instance, the typical gas evolution may be dramatically increased and gas may be liberated within the porous plate structure of the negative electrode. Therefore in an attempt to remediate sulfation (or decrease sulfate crystal growth), gas may be introduced into the interstitial region of the electrode, which may result in insufficient electrolyte penetration, increased corrosion of the grids, increased consumption of water from the electrolyte, increased ionic resistance (as the gas is an insulator), reduced performance of the lead-acid battery, the like, or combinations thereof. In this case, charge acceptance may be limited due to the blocking effect of trapped gas; and one problematic situation (sulfate crystal growth on the anode) has been substituted for another (excessive gas evolution into or within the anode).

Some battery manufacturers have attempted to solve the problems described above by changing the surface area of the carbon materials added to the negative electrode or by reducing the amount of carbon material added to the negative electrode. However, these solutions have not proven entirely effective for improving the life cycle performance of the relevant lead-acid batteries.

Because of the above-identified issues with adding engineered carbon materials to the negative active material of an anode, the inventors of the present disclosure discovered it may be advantageous to add carbon materials, such as engineered carbon materials, to a battery separator, which separator is used in a lead-acid battery. In some embodiments, the carbon material is added to the negative active material (NAM) surface of the battery separator, meaning the surface of the separator that will come into contact with the negative electrode or anode.

Adding one or more carbon materials to a battery separator in accordance with the invention described herein means that the carbon material is not being added, by way of example only, to a monolithic negative electrode itself and rather is being added to the battery separator. Various improvements may be realized from doing so, including, but not limited to: carbon material is no longer taking up space that could be better reserved for the negative active material (NAM) of the electrode itself; and/or the gas evolution effect in the negative electrode is dramatically reduced.

As carbon materials, for example, engineered carbon materials are added to a battery separator for use in a lead-acid battery, in accordance with various embodiments described herein, one having skilled in the art may be concerned about the same type of gas production occurring within the separator. However, the inventors of the disclosure described herein have found that because the porosity of the separator tends to be greater than the porosity of the negative electrode, the pores of the separator according to embodiments of the present invention still have enough space to properly carry ions despite gas formation.

In various embodiments of the present disclosure, carbon materials, such as engineered carbon materials, are added to the negative active materials (NAM) surface of a battery separator. This is because the negative electrode is where sulfate crystal growth and gas evolution typically occur. It has been found that a battery separator according to the present invention may result in increased overall performance of a lead-acid battery because the battery's power is not being sacrificed by the use of carbon materials as part of the negative electrode itself. Such battery improvement can be manifested, by way of example, in an improved level of cold cranking amps (CCA) compared with batteries using traditional separators without the addition of the carbon materials described herein.

In some embodiments of the present invention, the battery separator may be made of polyolefin, for example, polyethylene, polypropylene, combinations thereof, and the like. In various embodiments of the present invention, the battery separator may be laminated to another layer comprising, by way of example, a glass layer, a polymer layer (such as polyester), a nonwoven layer, or the like. In such embodiments, the laminate comprising, for example, a polyolefin battery separator and another layer, such as a nonwoven layer, will be intimately coupled with the negative electrode, and once gas evolution takes place in the lead-acid battery, the gas moves more into the pores of the nonwoven layer and therefore does not reside primarily in the pores of either the negative electrode or the polyolefin battery separator. This may result in improved overall performance of the lead-acid battery into which such a laminated or composite separator is incorporated. Overall, the addition of the carbon additive(s) and/or mineral additive(s) described herein to the negative active material surface of a battery separator for use in a lead-acid battery may result in: a modification of the sulfate crystal growth or formation in the battery system; a decrease in the excessive gas evolution in the system; an enhanced ability of the lead-acid battery to accept charge; and/or an improvement in the cycle life and/or performance of the lead-acid battery.

Carbon materials suitable for use with battery separators according to the present invention may include, but are not limited to:

Graphite;

Activated Carbon;

Carbon Black;

Graphenes and associated structural analogs;

Dendritic forms of Carbon;

Nanocarbon materials derived from various manufacturing methods;

Highly structured carbonaceous material (fullerene bucky-balls et al.);

Carbon monolithic and Carbon multi-component sol-gel materials; and

Combinations of the foregoing.

Desired surface area of carbon forms (BET method) that may be used in conjunction with embodiments discussed herein include, but are not limited to: greater than 10 sqm/g; and/or greater than 500 sqm/g; and/or greater than 1500 sqm/g; and/or greater than 3000 sqm/g; and/or greater than 5000 sqm/g. For example, in some embodiments, the surface area (BET method) of the carbon may be 10-5000 sqm/g; and/or 500-3000 sqm/g; and/or 1500-3000 sqm/g; or the like.

In various embodiments, the additive material, such as a carbon additive, is applied to the battery separator in a coating solution, paste, or slurry. For example, a desired concentration of carbon black (a finely divided powder) in an aqueous slurry (or paste or dispersion solution) may include, but is not limited to:

1-80% w/w; and/or 2-60% w/w; and/or 2-30% w/w of the carbon in the overall solution (where often, the remainder may be water and/or some mixture of water and one or more surfactants and/or additives).

The slurry or coating solution may be aqueous and may include a surfactant, for example an ionic or a non-ionic surfactant. Such a surfactant may, for example, allow electrolyte to wet out the pores of a given separator more readily. This may lead to a higher CCA rating for a given battery, which may be desirable in various applications. One example of a surfactant may include sodium dihexylsulfosuccinate. However, any number of surfactants may be used in accordance with the embodiments described herein. The surfactant may make up about 0.5 to about 10% by weight of the given coating solution/slurry/paste.

The porous nature of the separator may allow for rapid adsorption of the carbon dispersion on the surface with negligible penetration of the carbon particles into the pore structure of the separator. The separator may be coated by numerous methods including gravure roller, reverse-gravure, slot-die methods, pneumatic spray methods, dip coating methods, paint brush, sponge application, the like, etc.

The thickness of the carbon coating or layer may be adjusted to meet the design parameters of the electrode plate spacing in the battery. In general, coating thickness may be adjusted from sub-micron to several hundred microns.

The method of drying the coated separator may involve many forms of energy to drive off excess water. For example, microwave, forced air ovens, convection ovens, infra-red energy, solvent evaporative drying, azeoptropic drying, the like, etc. The contact time required to dry the separator will vary by method, coating thickness and constitution and separator surface pattern and thermal properties.

Benefits achieved through utilization of the elements described herein as the present disclosure may include, but are not limited to:

It is beneficial to displace additives from the active material when it is feasible for these additives to be positioned on adjacent peripheries, excluding containment within the active material of the electrode. The instant disclosure proposes this scenario by means of deploying additives from alternative substrates. This disclosure discusses a preferred means of executing such deployment through the addition of, for example, a carbon additive to a battery separator, such as a polyethylene (PE) separator substrate, as opposed to such an additive being part of a negative electrode. The benefit may be achieved by exchanging the volume previously required within the active material with additional active material. In essence, the battery may be rendered more robust through a simple increase in the density of active material due to the elimination of previously contained additives. The incorporation of said additives onto adjacent or peripheral substrates such as separators, wicking retainer mats, spacer mats, woven and/or nonwoven material comprised of synthetic fiber or cellulosic fiber, or the like may effectuate these and other benefits and are contemplated herein.

As examples, and clearly not limited thereto, incremental removal of the carbon additives from the NAM in favor of utilizing the negative surface of the separator as a carbon additive platform may bring the following benefits:

1. May remove carbon from the NAM allowing for additional active material or reduction in manufacturing complexity and cost.

2. May provide surface area for sulfate crystal nucleation without the corresponding loss of negative plate porosity especially in PSoC operation. Separator function may be unchanged.

3. Gas evolution at the plate may proceed normally without excessive nucleation within the plate pores. Gas may nucleate on the separator coating where the buoyant force may carry the gas to the surface of the electrolyte in the case of a flooded L-A system.

For possibly optimal results, the separator may be coated with carbon on the side in direct contact with the negative plate (e.g., the NAM surface of the separator). In some cases, adequate pressure exists between the plate and the separator to maintain contact between [plate<->coating<->separator]. The carbon additive may be employed on any profile or topological property present on the separator negative surface (e.g. ribs, mini-ribs, cross-ribs, land areas for later enveloping, etc.). By way of example only, various separators appropriate for use herein are equipped with ribs, which may keep distance or spacing between plates and keep plates apart and/or keep distance or spacing between the separator backweb and the plate. For instance, in FIG. 1(b), ribs are located on the inside of the pocket or envelope-style separator. In some instances, separators contain cross-ribs, and such cross-ribs may be located on the surface of the separator that contacts the anode or negative electrode or plate.

In some embodiments, a binder may be part of the coating, slurry, paste, or solution that includes carbon and is added to a separator to improve the separator. The composition of the binder may be functional or inert. Latex, liquid rubber, starch solutions, acrylonitriles, acrylates, their derivatives, polyolefins, and the like are examples of binders. In some embodiments, the binder is added independently to a separator and is not part of the coating, slurry, paste, or solution that includes carbon.

Alternately, the separator may include a layer of carbon chosen from the list of suitable carbon options. This layer may be added to the separator as a separate layer, preferably on the side intended to face the negative plate surface or the carbon may be embedded in the negative facing surface of the separator through any number of means including co-extrusion or embedding the carbon onto the surface mechanically during extrusion/calendaring/cooling operations. While not the preferable separator, these application methods could also lend themselves to enhancing microporous separators produced via technologies not in such widespread use as rubber or PVC.

Carbon application may not be limited to the type of separator but can be administered for delivery through any number of means as long as it can achieve intimate contact with the surface of the negative plate active material and may be generally prevented from forming a direct conductive pathway between the positive and negative plates. For example a multi-layer or composite separator may have a carbon containing, conductive layer adjacent the negative plate and a second non-conductive layer adjacent the positive plate.

The carbon may be dispersed through the volume of the separator if desired, in some instances depending on the carbon loading concentration and density toward the positive plate a nonwoven mat may be desirable between the carbon containing separator and the positive electrode to prevent undesirable self-discharge.

In some types of lead-acid batteries or specific applications it may prove beneficial to use a nonwoven mat either alone or in conjunction with a customary separator, such as a polyethylene separator. Carbon may be applied to or as a component of the nonwoven.

The carbon additives described herein may be applied in various ways, for example, applied with the pasting paper or mat that is applied directly to the surface of the battery plate either during plate manufacture or assembly. Carbon can be applied with the pasting paper, as a component or coating of the pasting paper, laminate or other structure whether intended to also function as paste adhesion unit. This material could be used as a pasting paper during the manufacture of the lead plates, laminated to the separator, assembled as a layer in addition to the separator or even used as the complete separator depending on the lead-acid battery design.

As a simple method of incorporating the active carbon properties into a lead-acid battery, the carbon may be simply added inside the pouch in bulk material form when a common envelope of separator is used to wrap an individual plate. By adding the pouch around the negative plate and incorporating the carbon within the pouch the carbon is contained and intimately contacts the active material contained upon the surface of the negative plate. As one example, the negative plate may be coated in a mixture of carbon and oil or other binder as oxidative preventative and method of applying carbon directly to the surface of the negative active material for example.

The plate as intended for use in such a battery design could also be contacted directly through exposure to a suspension or colloidal mixture of carbon and the like additives herein that will provide the desired results or, alternatively the carbon may be topically applied by spraying or by electrostatic powder coating methods in plate form as an integral part of the manufacturing process.

The disclosure presented herein may provide a result that the carbon does not have to be a component of the negative active material to bring benefit. In fact, it has been discovered that application of such carbon as part or whole of a layer added near to, imbedded within, or directly to the outer surface of the paste may provide benefits of charge acceptance and cycle life improvement while reducing the negative effects associated with increasing carbon composition of the negative active material. This may bring the benefit of added conductance to prevent isolation of lead sulfate discharge products at or near the surface of the negative active material.

Various embodiments herein show that a separator coated with a solution or coating or paste containing the relevant carbon material may exhibit improved properties when compared with an uncoated separator without that coating of solution/coating/paste of the relevant carbon material. In addition, it has been found that in various embodiments herein, the relevant carbon material can be made into a free-standing, porous sheet of carbon and inserted into or next to the separator for use with a lead-acid battery. In various examples, such a carbon sheet may include more than 50% carbon material, and/or more than 70% carbon material, and/or more than 80% carbon material, and/or more than 85% carbon material. In one particular embodiment, a carbon sheet containing about 87% carbon may be used in conjunction with a separator described herein.

In other words, in various embodiments described herein, rather than input carbon material into the negative active material of the anode of a battery, carbon material may be placed somewhere else in the battery system and create, for example, unexpected benefits. Such carbon material may, in accordance with various embodiments herein, be placed on a separator, next to a separator, inside the pocket or envelope of a separator, as a coating, as a sheet, as carbon-loading inside the pocket of envelope of a separator (meaning that loose carbon may be inside the pocket or envelope around the plate therein), and/or the like.

EXAMPLES

Example 1: Application of Carbon to Polyethylene Lead-Acid Battery Separator

A coating solution, slurry, or paste was prepared and subsequently applied to the negative face of the separator as detailed below. FIG. 1(b) shows a battery separator for use in a lead-acid battery, for example, a polyethylene separator. In this particular embodiment shown in FIG. 1(b), the separator has a cross-ribbed shape (meaning it has major ribs as well as cross-ribs) and has a cut edge at the left which is open for insertion of a battery plate, a folded edge at the right, as well as top and bottom edges that have been closed by crimping or sealing or the like. The ribs may provide distance or separation for the battery separator. However, separators of many shapes may be used in embodiments herein. In FIG. 1(b), the polyethylene separator is not coated.

Figure 1A:
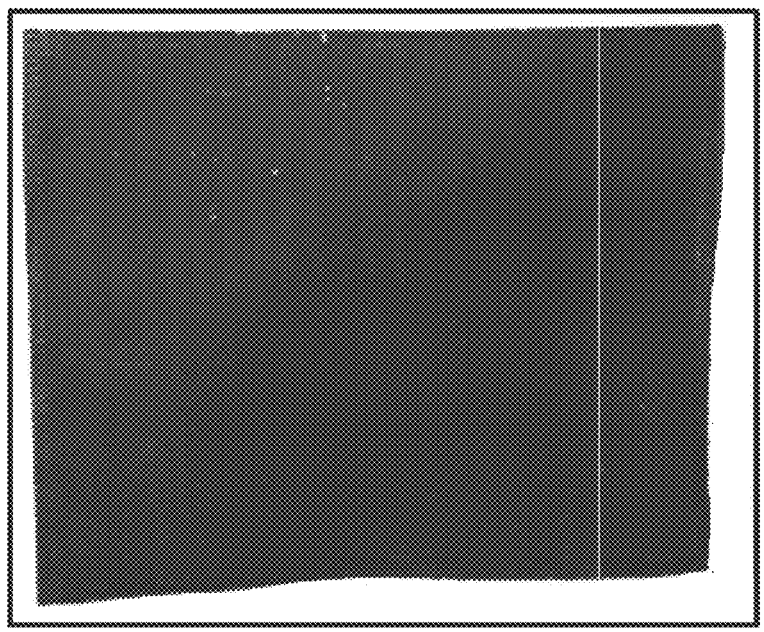
FIG. 1(a) depicts a separator that includes a coating of carbon, according to an embodiment described herein.

FIG. 1(a) shows a similar polyethylene separator for use in a lead-acid battery that has been coated with a coating of carbon black in accordance with embodiments described herein. Specifically, an aqueous coating solution (or slurry or paste) of carbon black was prepared by incorporating 2-3% by weight of a surfactant, here sodium dihexylsulfosuccinate (commercially available from Cytec Industries Inc., Woodland Park, N.J.) under the trade name of Aerosol MA-80. Carbon black, as a finely divided powdered form, commercially available from Cabot Carbon Corporation under the trade name of PBX51 carbon black (having a surface area of about 1850 sqm/g) was dispersed into the aforementioned aqueous surfactant solution.

Figure 2:
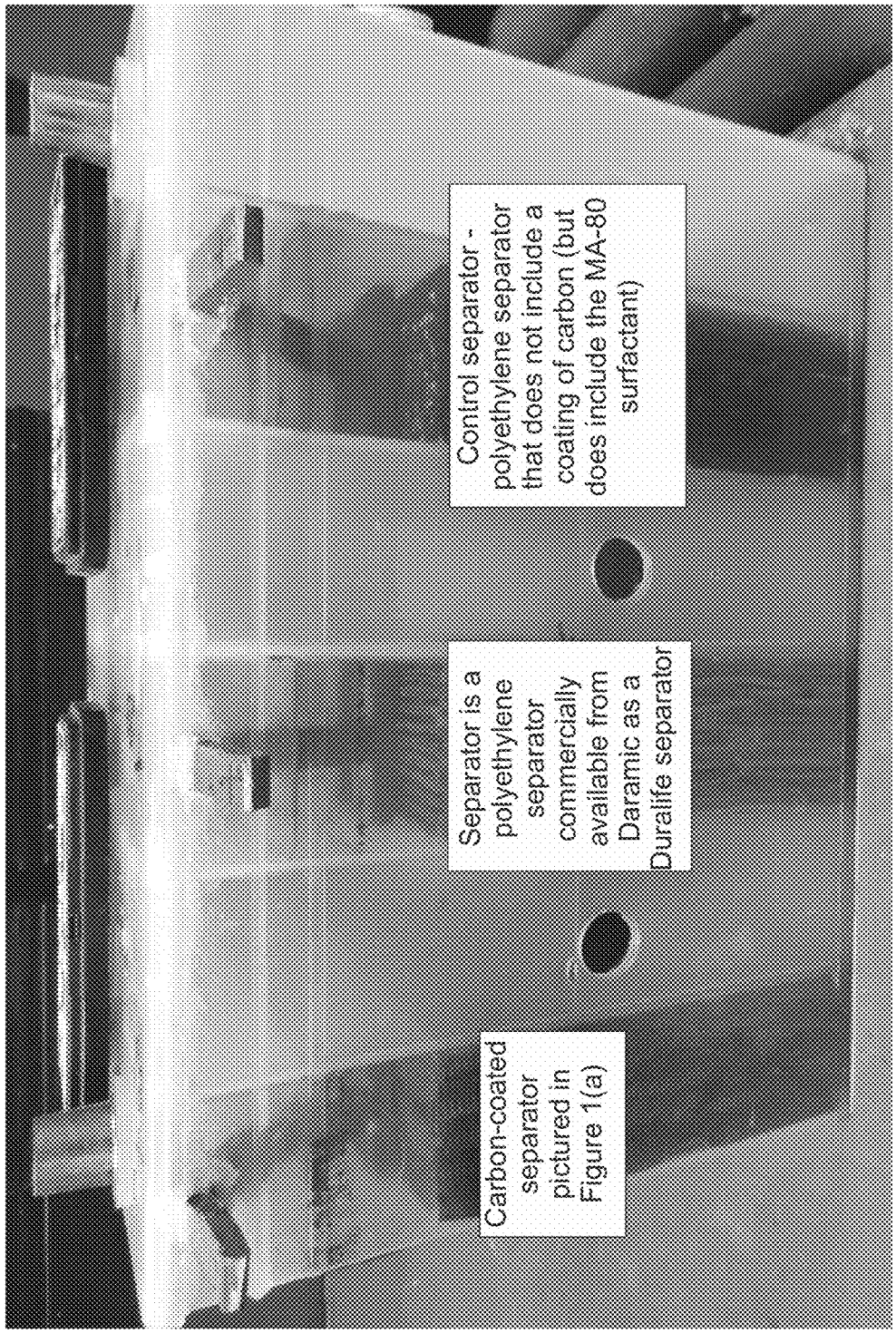
FIG. 2 includes a photographic image of three test lead-acid battery cells containing battery separators in accordance with embodiments described herein as well as control battery separators, in a charge acceptance test.

FIG. 2 represents three independent cells including various separators appropriate for use in lead-acid batteries to be cycled and tested. In the cell in the portion of FIG. 2 labeled 2(a), the separator is the carbon-coated separator pictured in FIG. 1(a). In the cell in the portion of FIG. 2 labeled 2(b), the separator is a polyethylene separator commercially available from Daramic as a Duralife separator. In the cell in the portion of FIG. 2 labeled 2(c), the separator is a "control" separator for various experiments performed herein and is a polyethylene separator that does not include a coating of carbon (but it does include the MA-80 surfactant). As shown in FIG. 2, multiple envelope-style or pocket-style separators are included in the various cells.

Figure 3:
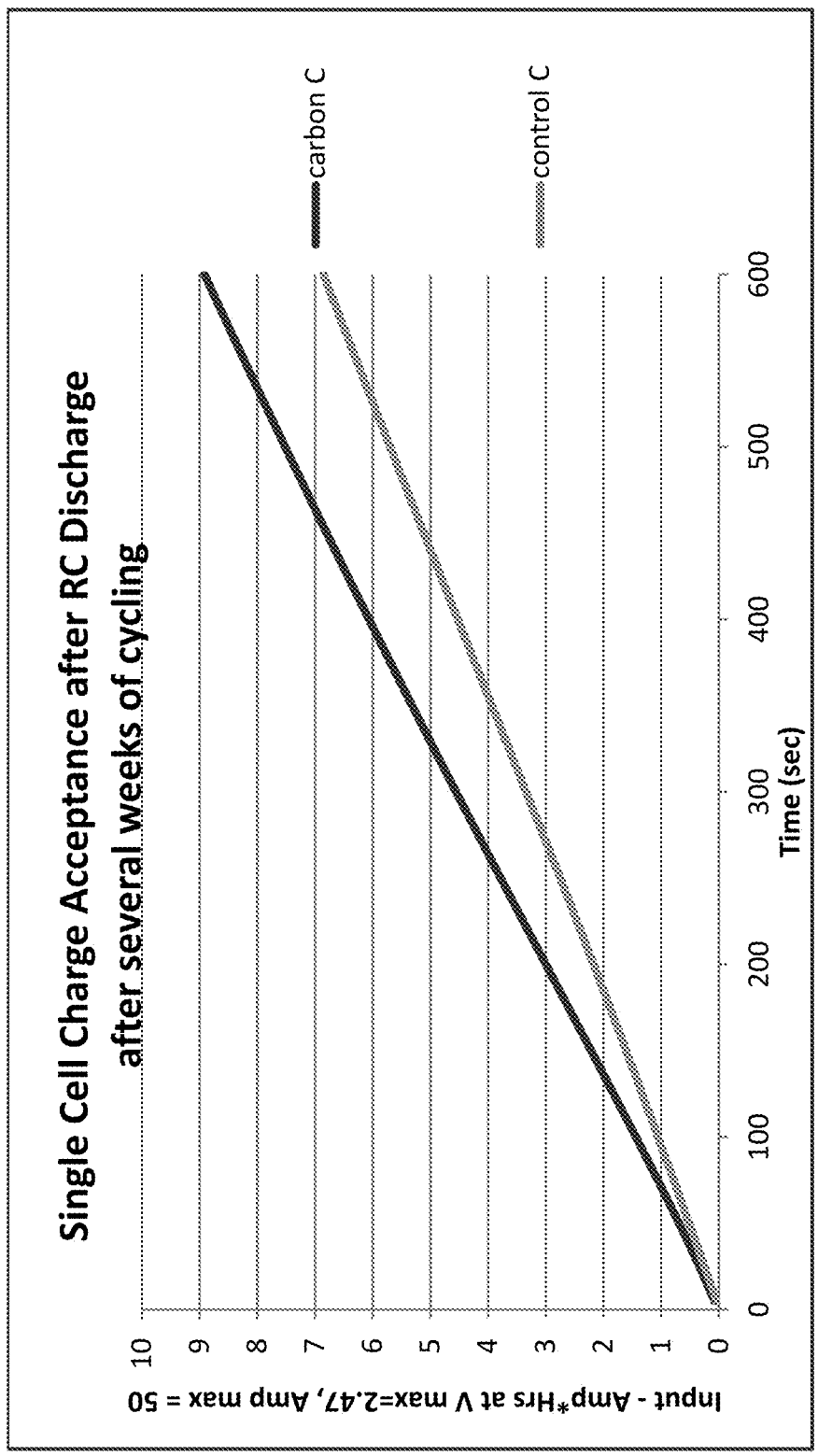
FIG. 3 is a line plot of data from examples of single cell charge acceptance after RC discharge after several weeks of cycling.
Figure 6:
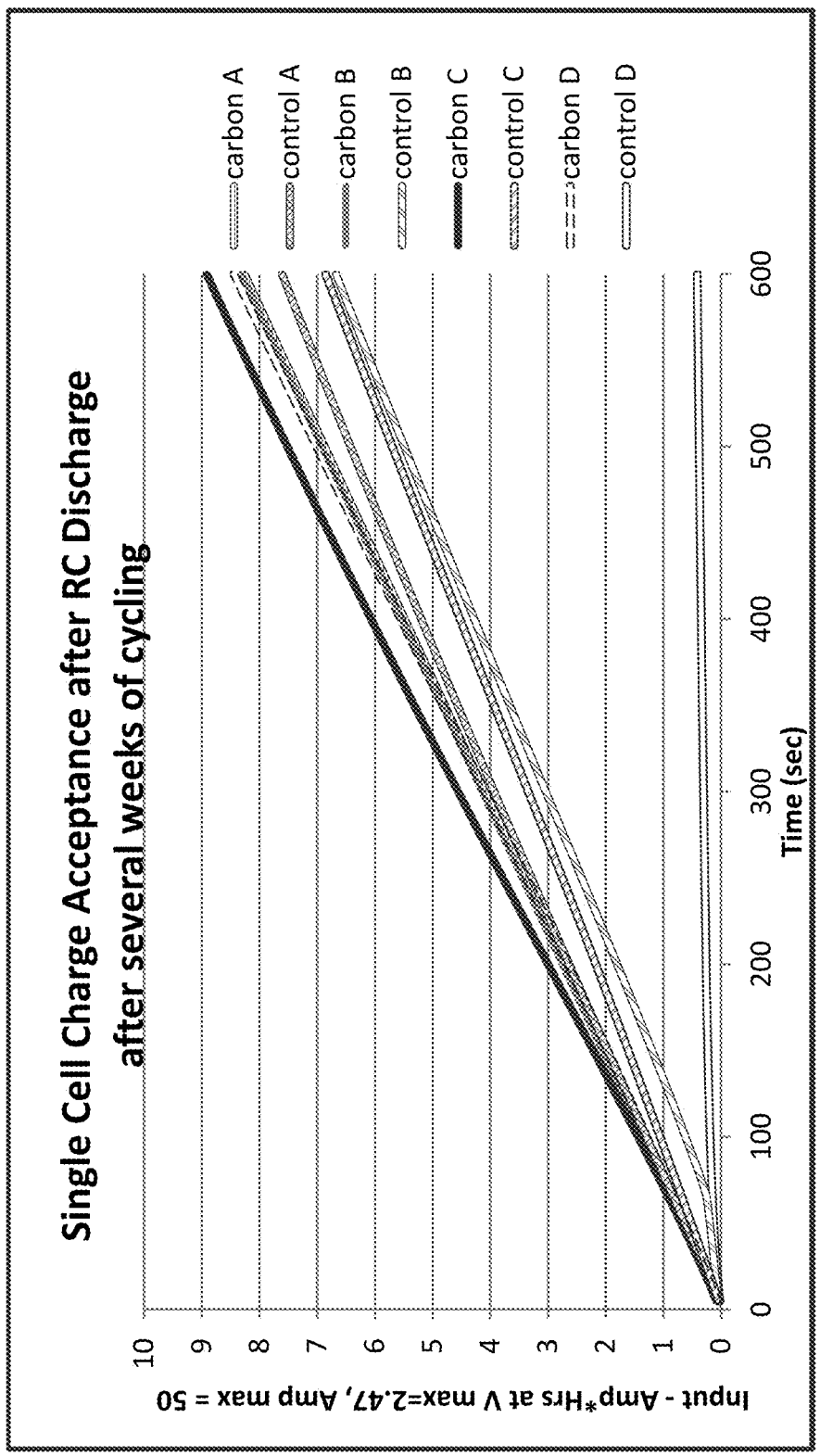
FIG. 6 is another line plot of data from examples of single cell charge acceptance after RC discharge after several weeks of cycling.

The cells were allowed to cycle for several weeks, and then various testing was performed to determine performance of the batteries including the separators (particularly the carbon-coated separators shown in FIG. 2(a) versus the control separators shown in FIG. 2(c)). The data included in FIGS. 3 and 6 show the single cell charge acceptance after reserve capacity ("RC") discharge after several weeks of cycling. FIG. 6 contains data from four repetitive sets of test data for the experimental cell and separators (Carbon A-D) and the control cells and separators (Control A-D), while FIG. 3 simply calls out one of the sets of data for Carbon C and Control C. The y-axis units of FIGS. 3 and 6, amp*hours, allow the data to be seen in more of a cumulative format. And the carbon-coated separators used in the cell to obtain the results for Carbons A-D performed better regarding single cell charge acceptance when compared to the uncoated Control A-D separators (see FIGS. 3 and 6).

Figure 4:
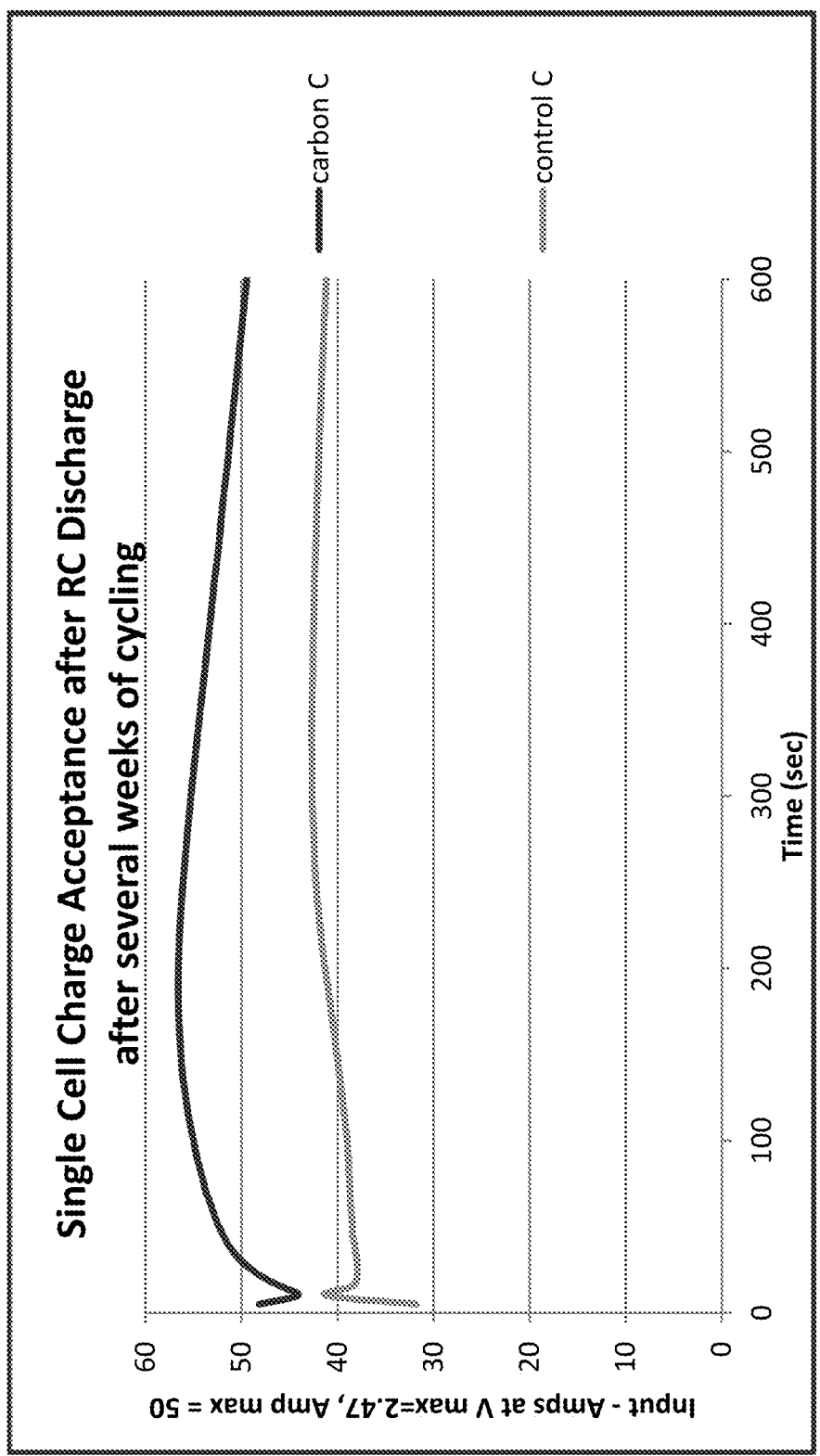
FIG. 4 is another line plot of data from examples of single cell charge acceptance after RC discharge after several weeks of cycling.
Figure 5:
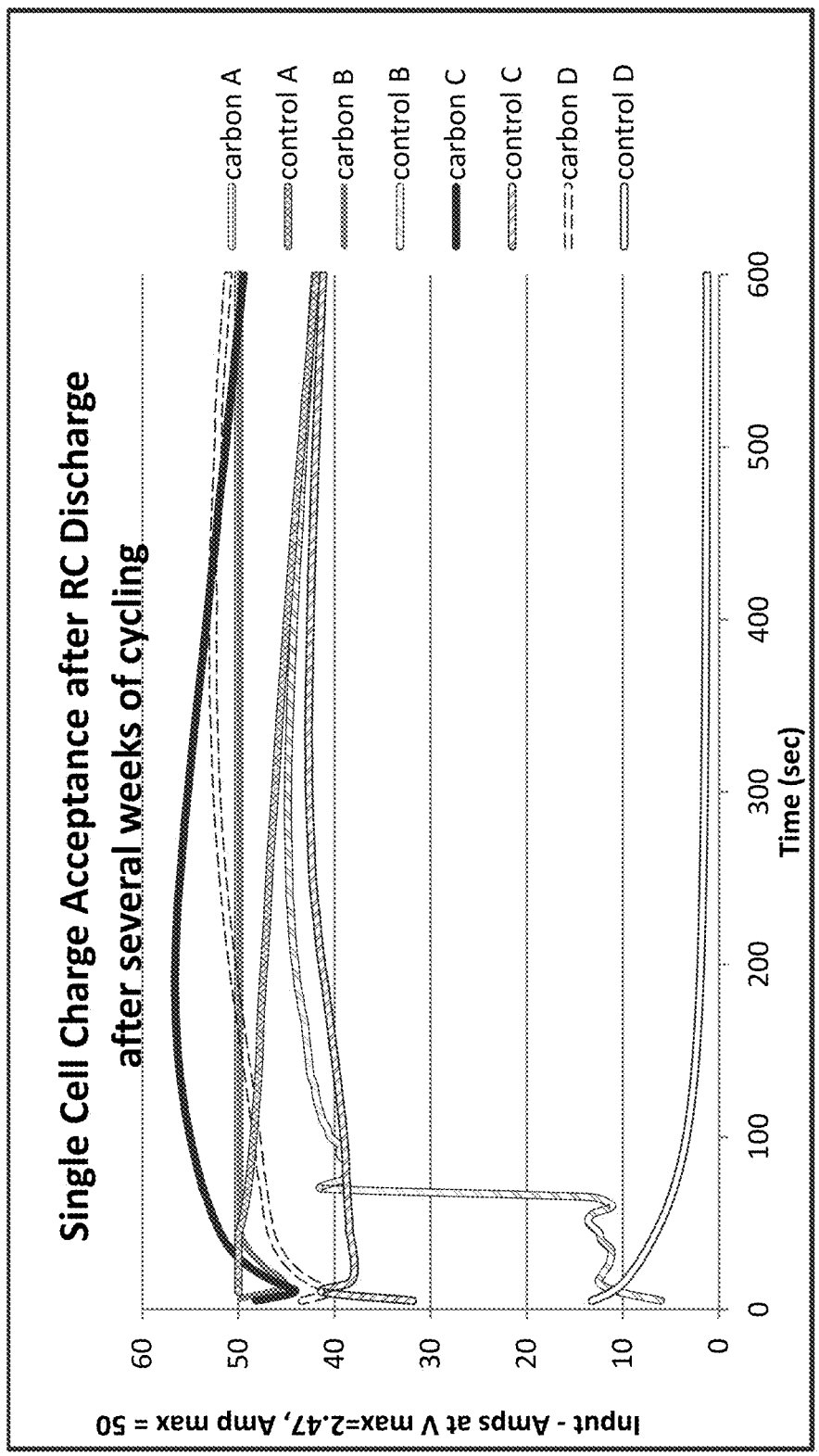
FIG. 5 is another line plot of data from examples of single cell charge acceptance after RC discharge after several weeks of cycling.

The data included in FIGS. 4 and 5 show the single cell charge acceptance after RC discharge after several weeks of cycling. FIG. 5 contains data from four repetitive sets of test data for the experimental cell and separators (Carbon A-D) and the control cells and separators (Control A-D), while FIG. 4 simply calls out one of the sets of data for Carbon C and Control C. The y-axis units of FIGS. 4 and 5, amps, allow the data to be seen in more of an instantaneous format. And the carbon-coated separators used in the cell to obtain the results for Carbons A-D performed better regarding single cell charge acceptance when compared to the uncoated Control A-D separators (see FIGS. 4 and 5).

Figure 7:
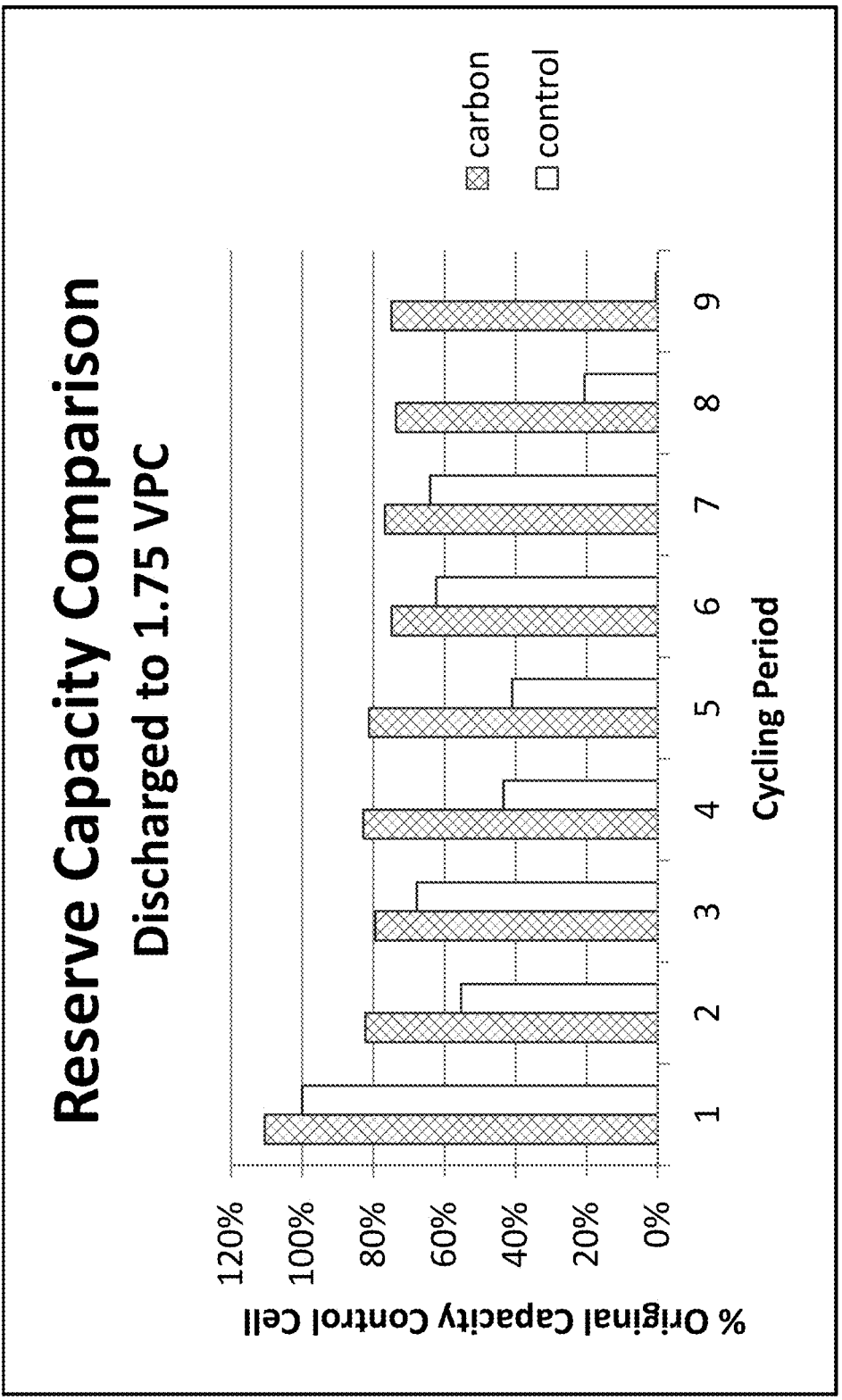
FIG. 7 is a bar chart based on the data from FIGS. 3-6 showing a reserve capacity comparison for experimental and control cells.

More test data is reflected in FIG. 7, which shows that the carbon-coated battery separators improved the reserve capacity of the cell after various cycling periods. Thus, it may be important that the carbon-coated separator caused the cell to gain charge acceptance and increase in reserve capacity as well as retaining these properties throughout cycling.

Figure 8:
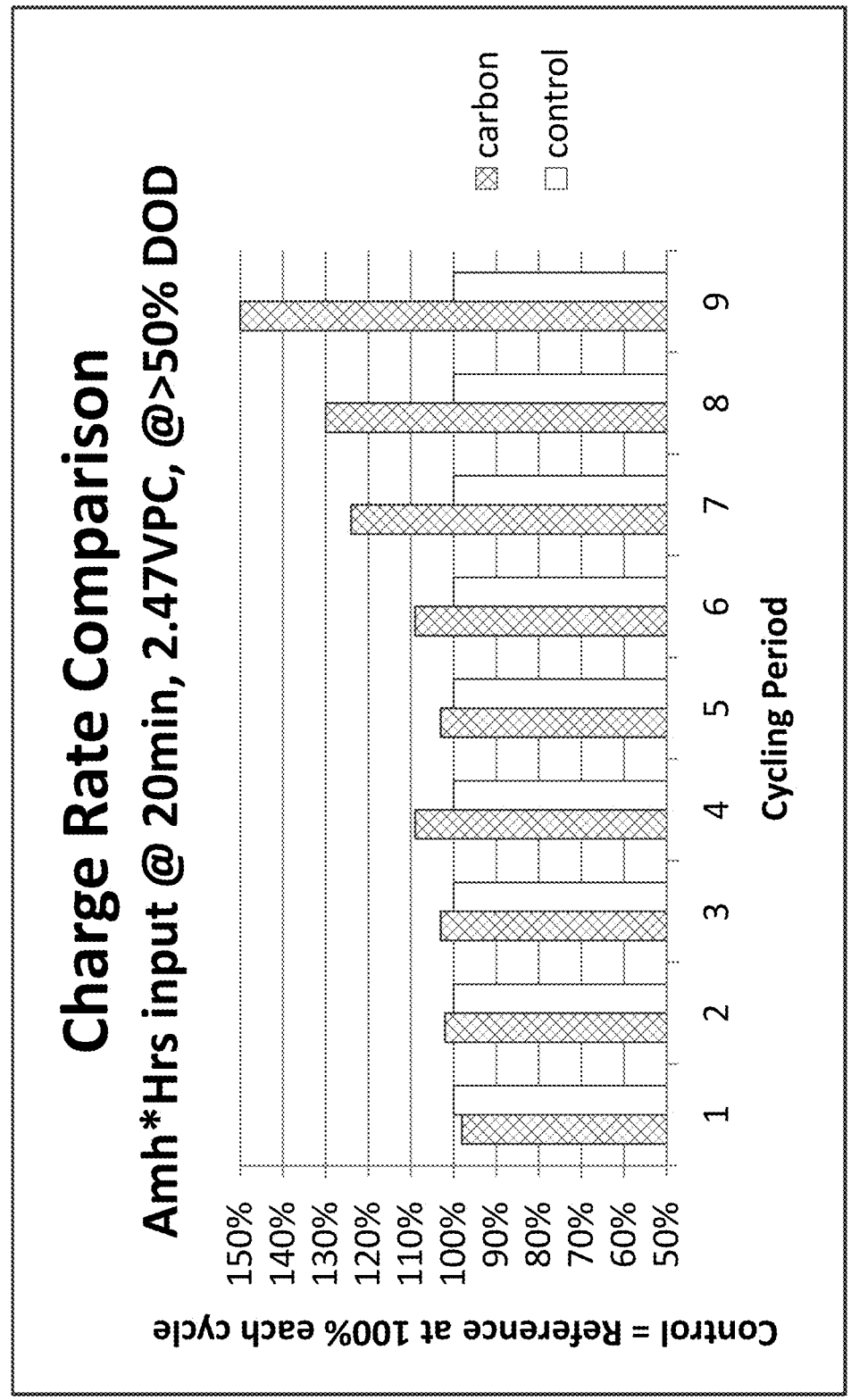
FIG. 8 is another bar chart based on the data from FIGS. 3-6 showing a charge rate comparison for experimental and control cells.

Similarly, FIG. 8 represents the results of various tests of the experimental and control cells mentioned above and shows the charge acceptance after various cycling periods of the cells made with the experimental, carbon-coated separator as well as with the control, un-coated separator. In FIG. 8, it can be seen that even when more than half of the battery's energy has been removed (as seen from the notation of greater than 50% DOD or depth of discharge), the charge acceptance of the cell improved over time and continued to improve even after successive cycling periods. The charge acceptance property improved, and the cell(s) using carbon-coated separator were better able to accept charge.

In accordance with at least selected embodiments, aspects or objects, the instant disclosure or invention is directed to new or improved battery separators, components, batteries, systems, electrodes, and/or related methods of production and/or use, to a battery separator with carbon or mineral additives for use in a lead-acid battery, to carbon and mineral additives, and to batteries including such separators or carbon and/or mineral additives. In at least certain embodiments, the instant disclosure relates to new or improved lead-acid battery separators, batteries, systems, and/or methods of manufacture and/or use thereof. In at least select certain embodiments, the instant disclosure is directed toward a new or improved lead-acid battery separator with carbon or mineral additives on at least one surface or layer, and/or methods for constructing lead-acid battery separators and batteries with such carbon and/or mineral additives for enhancing the lead-acid energy storage performance, reducing lead content, improving charge rate, reserve capacity, charge acceptance, cycle life, and/or the like.

In at least other selected embodiments, an improved battery separator and/or battery reduces required lead content, reduces separator electrical resistance (ER), increases cycle life, adds conductive material, increases cold cranking amperage (CCA) efficiency, increases open circuit voltage (OCV), minimizes entrapped gas, increases reserve capacity, improves capacitance properties, improves utilization of active material, reduces energy consumption, reduces negative plate diffusion, and/or the like.

In at least other selected embodiments, there are provided at least one of:
a battery separator for a lead-acid battery with enhanced lead-acid energy storage performance.

A battery separator for a lead-acid battery as shown and described herein.

The above battery separator for a lead-acid battery comprising:
an additive applied to the battery separator for enhancing lead-acid energy storage performance of the lead-acid battery.

The above battery separator wherein the additive is a carbon or mineral additive applied to the separator.

The above battery separator wherein the additive comprises engineered carbon materials applied to the battery separator to modify sulfate crystal formation while decreasing the detrimental consequences of excessive gas evolution into a negative electrode.

The above battery separator wherein the engineered carbon materials are selected from the group consisting of: carbon black; graphite; activated carbon; and combinations thereof.

The above battery separator wherein the additive is applied to a negative active material (NAM) surface of the battery separator.

The above battery separator wherein the additive slows the sulfation effect under partial state of charge (PSoC) conditions, wherein:
sulfate crystal growth is directly influenced by available surface area (nucleation sites) within a plate of the battery;
increased surface area provides a driving force for the establishment of small less stable crystals with less impact on the porous nature of the negative electrode;
under typical and PSoC conditions, the electrode produces gas as the over-potential of hydrogen is reached;
as high surface area carbons are introduced directly into the NAM, acceleration of both gas and sulfate nucleation occurs, where the typical gas evolution is dramatically increased and gas is liberated within the porous plate structure;
gas is introduced into the interstitial region of the electrode, which results in insufficient electrolyte penetration, increased corrosion of the grids, increased consumption of water from the electrolyte, increased ionic resistance, the like, or combinations thereof;
charge acceptance may be limited due to the blocking effect of trapped gas; or combinations thereof.

The above battery separator wherein the engineered carbon materials are selected from the group consisting of: Graphite; Activated Carbon; Carbon Black; Graphenes and associated structural analogs; Dendritic forms of Carbon; Nanocarbon materials derived from various manufacturing methods; Highly structured carbonaceous material (fullerene bucky-balls et al.); Carbon monolithic and Carbon multi-component sol-gel materials; the like, and combinations thereof.

The above battery separator wherein the additive having a surface area selected from the group consisting of: 10-5000 sqm/g; 500-1500 sqm/g; and 1500-3000 sqm/g.

The above battery separator wherein the additive is applied to the negative face of the separator.

The above battery separator wherein the additive includes an aqueous coating solution having:
0.5 wt. %-10 wt. % of a surfactant; and
carbon black in a finely divided powdered form dispersed into the aqueous surfactant solution.

The above battery separator wherein the surfactant being an ionic surfactant.

The above battery separator wherein the ionic surfactant being a Sodium dihexylsulfosuccinate in a concentration in the range of 2-3 wt/%.

The above battery separator wherein the carbon black having a concentration selected from the group consisting of: 1-80% w/w; 2-60% w/w; and 2-30% w/w.

The above battery separator wherein the porous nature of the separator allowing for rapid adsorption of the carbon dispersion on the surface with negligible penetration of the carbon particles into the pore structure of the separator.

The above battery separator whereby the separator may be coated by methods selected from the group consisting of: gravure roller; reverse-gravure; slot-die methods; pneumatic spray methods; dip coating methods; paint brush; sponge application; the like; and combinations thereof.

The above battery separator wherein the thickness of the carbon coating being adjustable to meet the design parameters of the electrode plate spacing in the battery, whereby coating thickness may be adjusted from sub-micron to several hundred microns.

The above battery separator wherein the method of drying the coated separator may involve any drying method to drive off excess water.

The above battery separator wherein the drying method being selected from the group consisting of: microwave; forced air ovens; convection ovens; infra-red energy; solvent evaporative drying (azeoptropic drying); the like; and combinations thereof.

The above battery separator wherein incremental removal of the carbon additives from the NAM in favor of utilizing the negative surface of the separator as a carbon additive platform brings the following benefits:

removes carbon from the NAM allowing for additional active material or reduction in manufacturing complexity and cost;

provides surface area for sulfate crystal nucleation without the corresponding loss of negative plate porosity especially in pSOC operation, where separator function is unchanged;

gas evolution at the plate proceeds normally without excessive nucleation within the plate pores, wherein gas nucleates on the separator coating where the buoyant force carries the gas to the surface of the electrolyte in the case of a flooded Lead-Acid system; or combinations thereof.

The above battery separator wherein the separator is coated with carbon on the side in direct contact with the negative plate (NAM).

The above battery separator wherein adequate pressure exists between the plate and the separator to maintain contact between [plate<->coating<->separator].

The above battery separator wherein the carbon additive may be employed on any profile or topological property present on the separator negative surface (e.g. ribs, mini-ribs, cross-ribs, land areas for later enveloping etc.).

The above battery separator wherein said additive being applied to the separator with a binder.

The above battery separator wherein the composition of the binder may be functional or inert.

The above battery separator wherein the binder being a latex, liquid rubber, starch solution, acrylonitriles, acrylates and their derivatives the like, or combinations thereof.

The above battery separator wherein said additive being a layer added to the separator as a separate layer.

The above battery separator wherein the additive layer being added on the side intended to face the negative plate surface.

The above battery separator wherein said additive being embedded in the separator.

The above battery separator wherein the additive being embedded in the negative facing surface of the separator.

The above battery separator wherein the additive being embedded throughout the separator.

The above battery separator wherein the additive being embedded in the separator by an embedding process being co-extrusion or embedding the carbon onto the surface mechanically during extrusion/calendaring/cooling operations.

The above battery separator further comprising a nonwoven mat between the carbon containing separator and the positive electrode to prevent undesirable self-discharge.

The above battery separator or improved battery or electrode wherein the additive being applied with a pasting paper or mat that is applied directly to the surface of the battery plate either during plate manufacture or assembly, wherein the additive can be applied with the pasting paper, as a component or coating of the pasting paper, laminate or other structure whether intended to also function as paste adhesion unit, whereby this material could be used as a pasting paper during the manufacture of the lead plates, laminated to the separator, assembled as a layer in addition to the separator or even used as the complete separator depending on the lead acid battery design.

The above battery separator wherein the additive being added inside the pouch in bulk material form when a common envelope of separator is used to wrap an individual plate, wherein by adding the pouch around the negative plate and incorporating the carbon within the pouch the carbon is contained and intimately contacts the active material contained upon the surface of the negative plate.

The above battery separator or improved battery or electrode wherein the plate as intended for use in such a battery design is contacted directly through exposure to a suspension or colloidal mixture of carbon and like additives herein that will provide the desired results; alternatively, the carbon may be topically applied by spraying or by electrostatic powder coating methods in plate form as an integral part of the manufacturing process.

The above battery separator further comprising a microporous membrane in combination with a synthetic nonwoven impregnated with mineral fillers.

The above battery separator wherein said membrane being a polymer filled membrane.

The above battery separator wherein said polymer being a polyolefin.

The above battery separator wherein said filler being a silica based material.

The above battery separator wherein said membrane having ribs.

The above battery separator wherein said ribs being ribs running in a machine direction and/or a cross machine direction.

In a battery, the improvement comprising the above battery separator and/or electrode.

An additive for use in a composite battery separator for a lead acid battery such as an ISS, HEV, or EFB battery, and comprising an additive applied to the battery separator for enhancing the lead-acid energy storage performance.

A method of enhancing the lead-acid energy storage performance of a lead acid battery.

A method of enhancing the lead-acid energy storage performance of a lead-acid battery as shown and described herein.

A method of enhancing the lead-acid energy storage performance of a lead acid battery comprising the step of providing a battery separator with an additive applied to the battery.

The above method including delivering carbon to the negative active material surface of the battery separator where the carbon may most effectively enhances charge acceptance and improves life cycle performance of a lead-acid battery.

A reduced lead content battery as shown or described herein.

A novel or improved battery separator for a reduced lead content battery as shown or described herein.

In accordance with other embodiments, one ca reduce the quantity of lead currently required to manufacture Flooded SLI Batteries, by for example, at least one of:

Reduce Lead Content for SLI Batteries while Retaining or Enhancing Existing Benchmarked Performance Attributes.

Reduce Separator Electrical Resistance by 25%
- Separator acts as limiting resistance within the energy storage device.
- Substantial reduction in the separator resistance (e.g. 20-30%) is a means for increasing Cold Cranking Amperage (CCA) efficiency.
- In Lead-Acid SLI battery systems the CCA rating is critical for engine starting capabilities, especially at extreme temperatures.
- The CCA rating is a well established industry metric which may be key to customer acceptance and selection of aftermarket as well as OEM batteries.
- Industry expectations for CCA exist and as low resistance separators play a role in enhancing the CCA three (3) options become available to battery manufacturers.
- The CCA rating may be held constant while removing active material from the electrode plates and/or removing electrode plates from the battery design.
- The removal of Lead through active material and/or plates is especially attractive as performance is retained while manufacturing costs are significantly reduced.
- The CCA rating may be increased for specific battery systems which operate in challenging conditions.
- The CCA rating may be increased as a means to solicit a higher degree of consumer acceptance.

Alternative Current Distribution
- US Patent Application (2008/0076028A1) describes the application of a oxidation resistant conducting metal to the ribs of a lead-acid battery separator. The conducting ribs contact the active material adhered to the electrode plate directly to increase utilization of the active material and reduce the oxidative corrosion of the lead structure comprising the electrode plate itself.
- In the aforementioned application the result achieved was a 20-30% increase in cycle life for the battery.
- A novel approach utilizes the cited concept of current distribution through deposition of conductive carbonaceous compounds and alternative conductive materials onto the separator ribs and alternatively onto a cellulosic material known to the industry as a platform for active materials on the electrode.
- In this case the current is distributed with benefit to cycle life and inhibition of positive grid corrosion mechanisms.
- In many cases as little as 30% of the active material applied to the electrodes is actually utilized. In these cases improved current distribution through a conductive pasting paper or conductive rib surface offers the option to remove substantial amounts of positive and negative active material from the electrode plates resulting in manufacturing cost savings while retaining or improving performance over the unmodified SLI battery.
- Additionally, the lead grid comprising the electrode may be redesigned to remove lead that is no longer required due to the current distribution function of the separator or alternative conductor foundation (pasting paper).

Address Negative Plate Diffusion
A The negative electrode is the limiting component within the SLI battery in terms of Cold Cranking Amperage (CCA). During discharge the negative electrode produces sulfuric acid electrolyte as the positive electrode consumes acid electrolyte. During the charging cycle these roles are reversed.

Modifying the pore structure of the separator to enhance diffusive flow of the electrolyte to the negative electrode provides a means for increasing the CCA efficiency which in turn provides a similar set of benefits to the consumer and manufacturer as noted previously in the "High Porosity/Low Electrical Resistance" section.

- The CCA rating may be held constant while removing active material from the electrode plates and/or removing electrode plates from the battery design.
- The removal of Lead through active material and/or plates is especially attractive as performance is retained while manufacturing costs are significantly reduced.
- The CCA rating may be increased for specific battery systems which operate in challenging conditions.
- The CCA rating may be increased as a means to solicit a higher degree of consumer acceptance.

Separator with High OCV and Shallow Discharge
An improved separator is designed to have high open circuit voltage (OCV) with a shallow discharge profile. This attribute leads to less voltage drop for the battery over longer duration. The CCA associated with such batteries is inherently enhanced over that of a battery bearing conventional separators.

CCA enhancement can lead to the benefits to both consumers (through performance) and manufacturers (through cost savings). These benefits have been described previously and are specifically:
- The CCA rating may be held constant while removing active material from the electrode plates and/or removing electrode plates from the battery design.
- The removal of Lead through active material and/or plates is especially attractive as performance is retained while manufacturing costs are significantly reduced.
- The CCA rating may be increased for specific battery systems which operate in challenging conditions.
- The CCA rating may be increased as a means to solicit a higher degree of consumer acceptance.

Minimize Entrapped Gas
Entrapped gas within the battery leads to high resistance, reduced CCA and reduced reserve capacity.

The surface geometry of the separator as dictated by the rib design is one important methods for reducing entrapped gas in the area between the electrode and the separator.

Another concept which functions upon the whole of the battery is to strategically place a material bearing high random surface area (anisotropic) within the battery compartment to allow for access to the bulk electrolyte itself. The electrolyte as a bulk fluid contains dissolved gasses by nature. The concentration of the dissolved gasses naturally varies with the temperature of the electrolyte through solubility properties. It is important to take into consideration the entirety of the battery when reducing dissolved or entrapped gas. The electrolyte resistance is altered as the gas dissolution increases and hence it is an advantage to maintain a constant and low level of dissolved or entrapped gas under all operating conditions.

As the magnitude of the effect of dissolve/entrapped gas is known on key properties such as CCA and Reserve Capacity it becomes apparent that this area leads to optimization of the active material through reduction. The means of reducing active material in this case is the elimination of resistance within the battery system.

Separator with Capacitance Properties

Ultra-capacitors or Super-capacitors are known and in the most simple sense these designs allow for the storage of charge and rapid release of the stored charge. These devices are not batteries as they are not capable of actually sustaining a chemical reaction leading to prolonged operation without a external charging source. The concept of a capacitor-battery hybrid however can provide performance and manufacturing advantages.

Forming a layer of capacitance grade (high surface area) carbonaceous material on separator side in contact with the Negative electrode can be accomplished by several means of deposition. The negative electrode is chosen as the contacting surface as it is this electrode that dictates the magnitude of the CCA. As the battery operates under nominal conditions, the capacitance grade carbonaceous material build up a surface resident charge density. Upon heavy discharge such as during the ignition of an engine, this charge is transferred to the negative electrode providing a "boost" to the reaction kinetics.

In the aforementioned application active material is utilized in a more efficient manner facilitating removal of active material from the battery and thus a notable benefit to the manufacturer through cost reduction.

More possible benefits:
Formation Time Reduction
    Higher Utilization of Fixed Assets
    Lower Energy Consumption
Alternative Current Collector
    Improves Reserve Capacity
Minimize Entrapped Gas
    Improves Reserve Capacity
    Improves Charge Acceptance
Address Negative Plate Diffusion
    Improves Charge Acceptance In accordance with at least selected embodiments, aspects, or objects, there are provided improved battery separators, batteries, systems, electrodes, and/or methods of manufacture, and/or use. In accordance with at least certain embodiments, aspects, or objects, the present disclosure or invention is directed to improved separators for lead acid batteries (including flooded, enhanced flooded (EFB), gel, VRLA, and/or the like) and/or improved batteries including such separators.

In accordance with at least certain embodiments, aspects, or objects, there are provided new or improved battery separators for lead-acid batteries that include a carbon or mineral additive applied to the separator. In possibly preferred embodiments, the battery separator may include engineered carbon materials applied to the battery separator to modify sulfate crystal formation while decreasing the detrimental consequences of excessive gas evolution into the negative electrode itself. In one embodiment, a method of enhancing the lead-acid energy storage performance of a lead-acid battery may include delivering carbon to the negative active material surface of the battery separator where the carbon may effectively enhance charge acceptance and improve life cycle performance of a lead-acid battery.

The present invention may be embodied in other forms without departing from the spirit and the essential attributes thereof, and, accordingly, reference should be made to the appended claims, rather than to the foregoing specification, as indicating the scope of the invention. Additionally, the invention illustratively disclosed herein suitably may be practiced in the absence of any element which is not specifically disclosed herein. Many other modifications and variations of the present invention are possible to the skilled practitioner in the field in light of the teachings herein. It is therefore understood that, within the scope of the claims, the present invention can be practiced other than as herein specifically described.

The invention claimed is:

1. A battery separator for a lead-acid battery with enhanced lead-acid energy storage performance, the battery separator comprising a polyolefin layer or a polyolefin layer and a non-woven mat, the separator formed into an envelope for enclosing an electrode of a battery, wherein a porous sheet formed from a carbon material and comprising from greater than 50% carbon material is placed inside the envelope.

2. The battery separator of claim 1 wherein the carbon material is an engineered carbon material.

3. The battery separator of claim 1 wherein the carbon material is at least one selected from the group consisting of carbon black, graphite, activated carbon, graphenes and associated analogs, dendritic forms of carbon, nanocarbon materials derived from various manufacturing methods, highly-structured carbonaceous materials including fullerene, bucky-balls, etc., carbon monolithic sol gel materials, and carbon multi-component sol gel materials.

4. The battery separator of claim 1 wherein the engineered carbon material is selected from the group consisting of: carbon black; graphite; activated carbon; and combinations thereof.

5. The battery separator of claim 1 wherein the carbon material is further applied to a negative active material (NAM) surface of the battery separator.

6. The battery separator of claim 1 wherein the carbon material slows the sulfation effect under partial state of charge (PSoC) conditions, wherein:
sulfate crystal growth is directly influenced by available surface area (nucleation sites) within a plate of the battery;
increased surface area provides a driving force
for the establishment of small less stable crystals with less impact on the porous nature of the negative electrode;
under typical and PSoC conditions, the electrode produces gas as the over-potential of hydrogen is reached;
as high surface area carbons are introduced directly into the NAM, acceleration of both gas and sulfate nucleation occurs, where the typical gas evolution is dramatically increased and gas is liberated within the porous plate structure;
gas is introduced into the interstitial region of the electrode, which results in insufficient electrolyte penetration, increased corrosion of the grids, increased consumption of water from the electrolyte, increased ionic resistance, the like, or combinations thereof;

charge acceptance may be limited due to the blocking effect of trapped gas; or combinations thereof.

7. The battery separator of claim 1 wherein the carbon material has a surface area selected from the group consisting of: 10-5000 sqm/g; 500-1500 sqm/g; and 1500-3000 sqm/g.

8. The battery separator of claim 1 wherein the carbon sheet comprises greater than 70% carbon material, greater than 80% carbon material, or greater than 85% carbon material.

9. The battery separator of claim 8 wherein the carbon sheet comprises about 87% carbon material.

10. The battery separator of claim 9 wherein the electrode enclosed I the envelope is a negative electrode.

11. The battery separator of claim 8 wherein adequate pressure exists between the plate, the sheet, and the separator to maintain contact between [plate<->sheet<->separator].

12. The battery separator of claim 11 wherein an inside surface of the envelope may include a profile or topological property selected from the group consisting of ribs, mini-ribs, cross-ribs, and ay combination thereof.

\* \* \* \* \*